US006654878B1

(12) United States Patent
Swanberg et al.

(10) Patent No.: US 6,654,878 B1
(45) Date of Patent: Nov. 25, 2003

(54) REGISTER BIT SCANNING

(75) Inventors: Randal Craig Swanberg, Round Rock, TX (US); Michael Stephen Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 09/657,117

(22) Filed: Sep. 7, 2000

(51) Int. Cl.$^7$ .............................................. G06F 9/308
(52) U.S. Cl. ....................... 712/234; 712/245
(58) Field of Search ................ 712/234, 245, 712/226, 227

(56) References Cited

U.S. PATENT DOCUMENTS

| | | | | |
|---|---|---|---|---|
| 4,546,432 A | * | 10/1985 | Umemura et al. | 712/42 |
| 6,009,512 A | * | 12/1999 | Christie | 712/226 |
| 6,170,052 B1 | * | 1/2001 | Morrison | 712/236 |
| 6,360,316 B1 | * | 3/2002 | Baraz | 712/226 |
| 6,367,004 B1 | * | 4/2002 | Grochowski et al. | 712/226 |
| 6,446,221 B1 | * | 9/2002 | Jaggar et al. | 714/30 |
| 6,574,590 B1 | * | 6/2003 | Kershaw et al. | 703/28 |

* cited by examiner

*Primary Examiner*—Eric Coleman
(74) *Attorney, Agent, or Firm*—Richard F. Frankeny; Winstead Sechrest & Minick P.C.; Volel Emile

(57) ABSTRACT

Testing register bits and in particular bitmask registers is a method employed in many computer architectures (e.g., IBM PowerPC, IA32, VAX, etc.) to manage instruction flow within a processor. Since the testing or scanning of bitmask registers for the first occurrence of a logic state (e.g., logic one) is done quite often, register scanning is implemented in hardware in these processors. Other computer architectures (e.g., Intel IA64) manage instruction flow with alternate methods and therefore do register scanning as a software construct. When software written for the first computer architecture (e.g., IBM PowerPC) is ported to a system with IA64 architecture, the program would execute with reduced speed. The IA64 architecture uses the EPIC instruction protocol and as such executes predicate instructions that employ a predicate register where each bit of the predicate register can be associated as the true or false result of a comparison. To scan a register in the IA64 architecture the register contents are loaded into the predicate register and a sequence of predicate instructions are executed in the order that the bits are to be scanned for the desired condition. The sequence of predicate instruction sequence returns the register bit that passes the predicate condition. In this manner the speed of register scanning necessary for the ported software can be increased over the software scanning of the IA64 architecture.

24 Claims, 2 Drawing Sheets

REGISTER BIT SCANNING

TECHNICAL FIELD

The present invention relates in general to methods and logic necessary to determine which bit in the sequence of bits stored in a register is the first logic one or zero.

BACKGROUND INFORMATION

Testing bits, in a register that were previously set to a logic one or zero in response to a program action, has been used extensively to manage operations within a processor during instruction execution. Some computer architectures (e.g., IBM PowerPC) are designed with testing of bits as a key operation, the testing or "scanning" of a register to test for particular ones and zeros is implemented as a hardware function so that system operating speed would not suffer by slower software bit testing. Other computer architectures (e.g., Intel IA64) may not use the same approach in the management of operations within the system processor and therefore a hardware register bit scanning operation (sequentially comparing a number of bits to determine a logic one or logic zero) is not implemented. If software written for the first system architecture (e.g., IBM PowerPC) is ported to a system with the second system architecture (e.g., Intel IA64), then the bit testing would have to be implemented only in software slowing the software program execution time.

Therefore, there is a need for a method for scanning the bits of a register where the scanning method is not explicitly implemented in hardware so that software ported from a system with hardware register scanning is not slowed when ported to a system without hardware register scanning.

SUMMARY OF THE INVENTION

Some computer system architectures (e.g., IBM PowerPC) use testing or scanning of register bits as a method of managing instruction flow in the system processor. Because register scanning is used extensively, it is implemented in hardware to ensure fast program executions. Other system architectures (e.g., Intel IA64) may use other methods of managing instruction flow which do not use register scanning. These architectures (e.g., IA64) implement register scanning using software code. If the software written for the system architecture using hardware register scanning is ported to the one which does not, the software may have slow execution. The IA64 architecture employs the EPIC protocol which uses the predicate instructions and corresponding predicate register. The present invention implements register scanning for ported software from the IBM PowerPC to the Intel IA64 by loading the register to be scanned into the predicate register and executing predicate instructions in the sequence that corresponding bits in the predicate register bits are to be tested. The predicate instruction sequence returns the desired bit sequence value when the predicate instruction condition passes. In this manner any register bit sequence may be scanned. Because the IA64 executes predicated branches in parallel, the imported software will run faster than if the standard IA64 software register scanning was employed.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
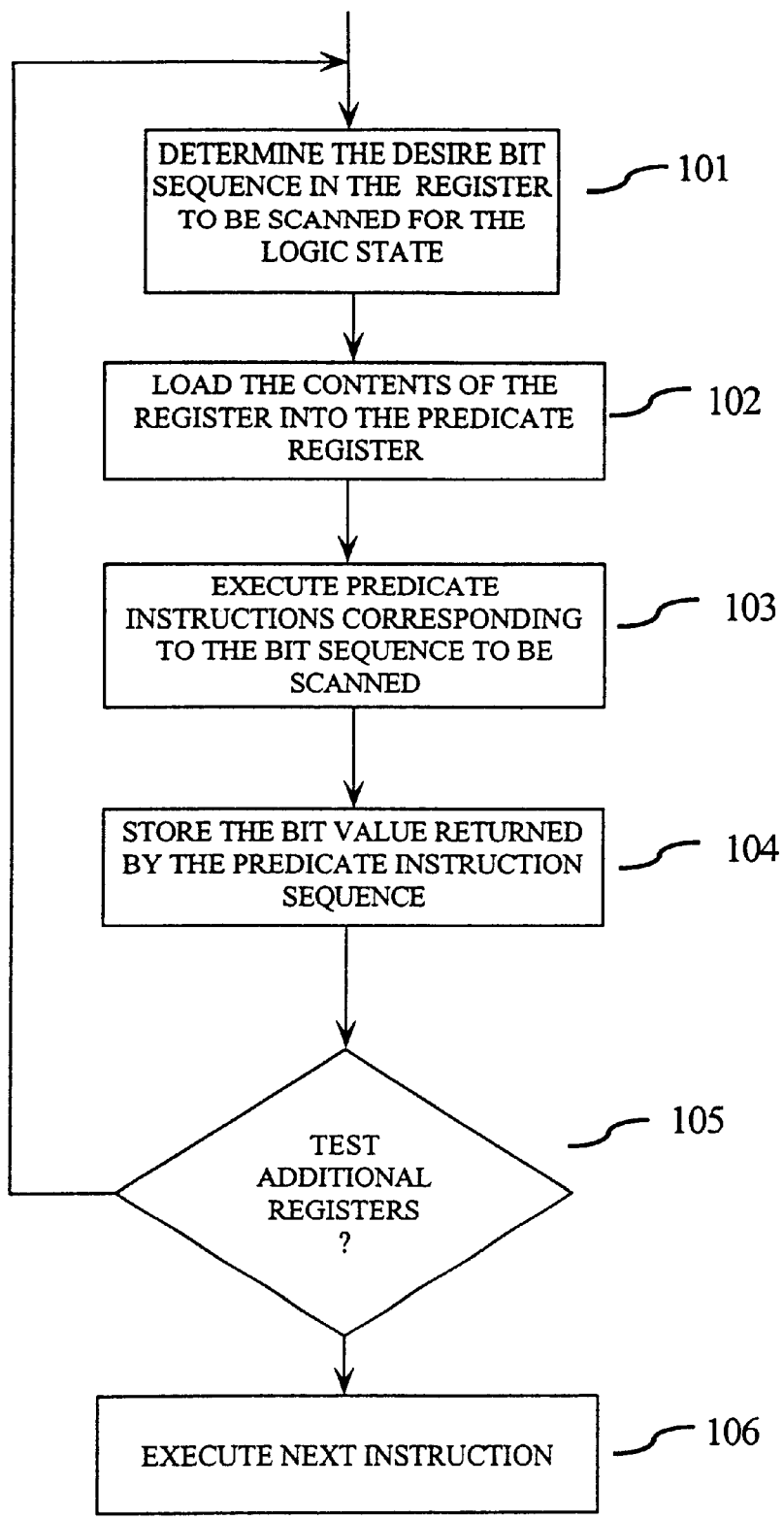
FIG. 1 illustrates method steps of embodiments of the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known elements may have been shown in block diagram form in order not to obscure the present invention in unnecessary detail. For the most part, details concerning timing considerations and the like may have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The Intel IA64 architecture employs the explicitly parallel instruction computing (EPIC) where all branch paths are explicitly executed as speculative instructions. A "predicate" register is used wherein each bit can be associated as a true (e.g., logic one) or false (e.g., logic zero) result of a comparison. A predicate instruction in IA64 is able to test a particular bit (e.g., bit 33) in the predicate register and return the bit value (33) if it the comparison is true and if not execute the next instruction. Since the IA64 architecture executes each branch using EPIC protocol, the predicate instructions (inherently branches) are fast (executed in parallel up to the limits of the parallel units in the processor). Embodiments of the present invention use predicate instruction sequences to enable a fast method of scanning register bits in an IA64 system. Embodiments of the present invention use a "load predicate" instruction to load the data from a particular register (e.g., bitmask register) into the predicate register. The predicate register in IA64 is a 64-bit register which operates as 64 single bit registers. If a particular sequence (e.g., bits 34, 35, 36, 39) of bits within a bitmask register (e.g., bitmask register A) is to be tested to determine the first appearance of a logic one, then the predicate instructions would take the form of the following:

"Load bitmask register A into the predicate register"
"Predicate 34, return 34 if true, else next"
"Predicate 35, return 35 if true, else next"
"Predicate 36, return 36 if true, else next"
"Predicate 39, return 39 if true, else next"
"Next instruction"

The syntax of the preceding instructions is not meant to conform to any code, however writing the instructions in English is useful in explaining the operation of embodiments of the present invention. In this example, it is desired to know which is the first logic one bit, in the sequence of bits 34, 35, 36, and 39, contained in bitmask register A. The contents of bitmask register A are loaded into the predicate register. Executing the first predicate instruction (predicate

34, return 34, else next) would compare bit 34 of the predicate register (bit 34 of the bitmask register A) and return the value 34 if it is a logic one, otherwise the next predicate instruction is executed. In this manner, the discontinuous sequence of bitmask A is scanned for the first occurrence of a logic one. If the system processor had four execution units (for this example), then in IA64 all four predicate instructions would be executed in parallel (if the system has four execution units) and the answer would be obtained very fast. Using embodiments of the present invention, any arbitrary sequence of bits within the predicate register (and therefore the desired bitmask register) may be tested by simply loading the predicate register and writing the appropriate sequence of predicate instructions.

The following are two examples of system operations implemented using embodiments of the present invention using actual code syntax.

EXAMPLE 1

Emulates the PowerPC "cntlzw" instruction. Returns the bit index (0–31 of the first logic "1" bit (scanned left to right); and returns 32 if none is found r8—returned bit index r32—input word (bit sequence) to scan

```
.type clz32, @function
proc clz32
c.z32::
         mov         r8 = 0                  // set starting bit count
         cmp4.eq     p6, p0 = r0, r32        // check for zero
         ;;
(p6)     mov         r8 =32                  // if so, retum 32
(p6)     br.ret.spnt  b0
         mov         r31 = pr                // save the predicates
         shl         r32 = r32, 8            // move to get away from p0
// pr8 = bit 0...pr39 = bit 31
;;
(p39)    br.ret.spnt  clz32_exit             // bit number 31 is a "1"
(p38)    add          r8 = 0x1, r8           // bit number 30 is a "1"
(p38)    br.ret.spnt  clz32_exit
(p37)    add          r8 = 0x2, r8           // bit number 29 is a "1"
(p37)    br.ret.spnt  clz32_exit
(p36)    add          r8 = 0x3, r8           // bit number 28 is a "1"
(p36)    br.ret.spnt  clz32_exit
(p35)    add          r8 = 0x4, r8           // bit number 27 is a "1"
(p35)    br.ret.spnt  clz32_exit
(p34)    add          r8 = 0x5, r8           // bit number 26 is a "1"
(p34)    br.ret.spnt  clz32_exit
(p33)    add          r8 = 0x6, r8           // bit number 25 is a "1"
(p33)    br.ret.spnt  clz32_exit
(p32)    add          r8 = 0x7, r8           // bit number 24 is a "1"
(p32)    br.ret.spnt  clz32_exit
(p31)    add          r8 = 0x8, r8           // bit number 23 is a "1"
(p31)    br.ret.spnt  clz32_exit
(p30)    add          r8 = 0x9, r8           // bit number 22 is a "1"
(p30)    br.ret.spnt  clz32_exit
(p29)    add          r8 = 0xa, r8           // bit number 21 is a "1"
(p29)    br.ret.spnt  clz32_exit
(p28)    add          r8 = 0xb, r8           // bit number 20 is a "1"
(p28)    br.ret.spnt  clz32_exit
(p27)    add          r8 = 0xc, r8           // bit number 19 is a "1"
(p27)    br.ret.spnt  clz32_exit
(p26)    add          r8 = 0xd, r8           // bit number 18 is a "1"
(p26)    br.ret.spnt  clz32_exit
(p25)    add          r8 = 0xe, r8           // bit number 17 is a "1"
(p25)    br.ret.spnt  clz32_exit
(p24)    add          r8 = 0xf, r8           // bit number 16 is a "1"
(p24)    br.ret.spnt  clz32_exit
(p23)    add          r8 = 0x10, r8          // bit number 15 is a "1"
(p23)    br.ret.spnt  clz32_exit
(p22)    add          r8 = 0x11, r8          // bit number 14 is a "1"
(p22)    br.ret.spnt  clz32_exit
```

-continued

```
(p21)    add          r8 = 0x12, r8          // bit number 13 is a "1"
(p21)    br.ret.spnt  clz32_exit
(p20)    add          r8 = 0x13, r8          // bit number 12 is a "1"
(p20)    br.ret.spnt  clz32_exit
(p19)    add          r8 = 0x14, r8          // bit number 11 is a "1"
(p19)    br.ret.spnt  clz32_exit
(p18)    add          r8 = 0x15, r8          // bit number 10 is a "1"
(p18)    br.ret.spnt  clz32_exit
(p17)    add          r8 = 0x16, r8          // bit number 9 is a "1"
(p17)    br.ret.spnt  clz32_exit
(p16)    add          r8 = 0x17, r8          // bit number 9 is a "1"
(p16)    br.ret.spnt  clz32_exit
(p15)    add          r8 = 0xa, r8           // bit number 8 is a "1"
(p15)    br.ret.spnt  clz32_exit
(p14)    add          r8 = 0xb, r8           // bit number 7 is a "1"
(p14)    br.ret.spnt  clz32_exit
(p13)    add          r8 = 0xc, r8           // bit number 6 is a "1"
(p13)    br.ret.spnt  clz32_exit
(p12)    add          r8 = 0xd, r8           // bit number 5 is a "1"
(p12)    br.ret.spnt  clz32_exit
(p11)    add          r8 = 0xe, r8           // bit number 4 is a "1"
(p11)    br.ret.spnt  clz32_exit
(p10)    add          r8 = 0xf, r8           // bit number 3 is a "1"
(p10)    br.ret.spnt  clz32_exit
(p9)     add          r8 = 0x10, r8          // bit number 2 is a "1"
(p9)     br.ret.spnt  clz32_exit
(p8)     add          r8 = 0x11, r8          // bit number 1 is a "1"
         ;;
clz32_exit
         mov          pr = r31, -1           // restores predicates
         br.ret.sptk  b0                     // return
.end clz32
```

EXAMPLE 2

Finds the first "1" bit from the middle of the bitmask outward which represents the first free disk block from the middle of the disk outward.

Disk block allocation is managed with a hierarchy of bitmask allocation words, with the highest level bitmask indicating groups of disk blocks, and then the lowest level bitmask indicating single physical disk blocks.

This allocation service can be called recursively starting with the highest mask word in the hierarchy resulting in finding the next free disk block that is closest to the center of the disk (for the most efficient average seek time latency).

```
.type allocate_disk_block, @function
.proc allocate_disk_block
allocate_disk_block::
         mov          r8 = r0                // set starting bit count
         cmp4.eq      p6, p0 -r0, r32        // if zero, no free blocks
         ;;
(p6)     mov          r8 = 32                //if so, return 32
(p6)     br.ret.spnt  b0
         mov          r31 = pr               // save the predicates
         shl          r32 = r32, 8           // moves to get away from p0
         mov          pr = r32, -1           // load mask into predicates
//pr8 = bit0...pr39 = bit 31
(p23)    add          r8 = 0x10, r8          // bit number 15 is a "1"
(p23)    br.spnt.few allocate_disk_block_exit
(p24)    add          r8 = 0xf, r8           // bit number 16 is a "1"
(p24)    br.spnt.few allocate_disk_block_exit
(p22)    add          r8 = 0x11 r8           // bit number 14 is a "1"
(p22)    br.spnt.few allocate_disk_block_exit
(p25)    add          r8 = 0xe, r8           // bit number 17 is a "1"
(p25)    br.spnt.few allocate_disk_block_exit
(p21)    add          r8 = 0x12 r8           // bit number 13 is a "1"
(p21)    br.spnt.few allocate_disk_block_exit
(p26)    add          r8 = 0xd, r8           // bit number 18 is a "1"
(p26)    br.spnt.few allocate_disk_block_exit
```

-continued

```
(p20)   add          r8 = 0x13, r8   // bit number 12 is a "1"
(p20)   br.spnt.few allocate_disk_block_exit
(p27)   add          r8 = 0xc, r8    // bit number 19 is a "1"
(p27)   br.spnt.few allocate_disk_block_exit
(p19)   add          r8 = 0x14, r8   // bit number 11 is a "1"
(p19)   br.spnt.few allocate_disk_block_exit
(p28)   add          r8 = 0xb, r8    // bit number 20 is a "1"
(p28)   br.spnt.few allocate_disk_block_exit
(p18)   add          r8 = 0x15, r8   // bit number 10 is a "1"
(p18)   br.spnt.few allocate_disk_block_exit
(p29)   add          r8 = 0xa, r8    // bit number 21 is a "1"
(p29)   br.spnt.few allocate_disk_block_exit
(p17)   add          r8 = 0x16, r8   // bit number 9 is a "1"
(p17)   br.spnt.few allocate_disk_block_exit
(p30)   add          r8 = 0x9, r8    // bit number 22 is a "1"
(p30)   br.spnt.few allocate_disk_block_exit
(p16)   add          r8 = 0x17, r8   // bit number 8 is a "1"
(p16)   br.spnt.few allocate_disk_block_exit
(p31)   add          r8 = 0x8, r8    // bit number 23 is a "1"
(p31)   br.spnt.few allocate_disk_block_exit
(p15)   add          r8 = 0x18, r8   // bit number 7 is a "1"
(p15)   br.spnt.few allocate_disk_block_exit
(p32)   add          r8 = 0x7, r8    // bit number 24 is a "1"
(p32)   br.spnt.few allocate_disk_block_exit
(p14)   add          r8 = 0x19, r8   // bit number 6 is a "1"
(p14)   br.spntfew allocate_disk_block_exit
(p33)   add          r8 = 0x6, r8    // bit number 25 is a "1"
(p33)   br.spnt.few allocate_disk_block_exit
(p13)   add          r8 = 0x1a, r8   // bit number 5 is a "1"
(p13)   br.spnt.few allocate_disk_block_exit
(p34)   add          r8 = 0x5, r8    // bit number 26 is a "1"
(p34)   br.spnt.few allocate_disk_block_exit
(p12)   add          r8 = 0x1b, r8   // bit number 4 is a "1"
(p12)   br.spnt.few allocate_disk_block_exit
(p35)   add          r8 = 0x4, r8    // bit number 27 is a "1"
(p35)   br.spnt.few allocate_disk_block_exit
(p11)   add          r8 = 0x1c, r8   // bit number 3 is a "1"
(p11)   br.spnt.few allocate_disk_block_exit
(p36)   add          r8 = 0x3, r8    // bit number 28 is a "1"
(p36)   br.spnt.few allocate_disk_block_exit
(p10)   add          r8 = 0x6, r8    // bit number 2 is a "1"
(p10)   br.spnt.few allocate_disk_block_exit
(p37)   add          r8 = 0x2, r8    // bit number 29 is a "1"
(p37)   br.spnt.few allocate_disk_block_exit
(p9)    add          r8 = 0x1e, r8   // bit number 26 is a "1"
(p9)    br.spnt.few allocate_disk_block_exit
(p38)   add          r8 = 0x1, r8    // bit number 30 is a "1"
(p38)   br.spnt.few allocate_disk_block_exit
(p8)    add          r8 = 0x1f, r8   // bit number 0 is a "1"
(p8)    br.spnt.few allocate_disk_block_exit
(p39)   mov          r8 = r0         // bit number 31 is a "1"
;;
allocate_disk_block_exit:
        move         pr = r31, -1    // restores predicates
        br.ret.sptk  b0              // return
.endp allocate_disk_block
```

The above two examples are actual code listings that may be used to implement register scanning using embodiments of the present invention.

FIG. 1 illustrates method steps of the present invention. In step 101, the register bit sequence to be scanned is determined. In step 102, the contents of the register to be scanned are loaded into the predicate register. In step 103, the sequence of predicate instructions corresponding to the predicate register bit sequence to be scanned is executed. Step 104 returns the register bit value corresponding to the bit passing the predicate instruction condition. In step 105, a test is executed to determine if additional register bits are to be scanned. If the result of the test in step 105 is true, a branch to step 101 is executed to execute another register scan. If the result of the test in step 105 is false, a branch to step 106 executes the next instruction.

Figure 2:
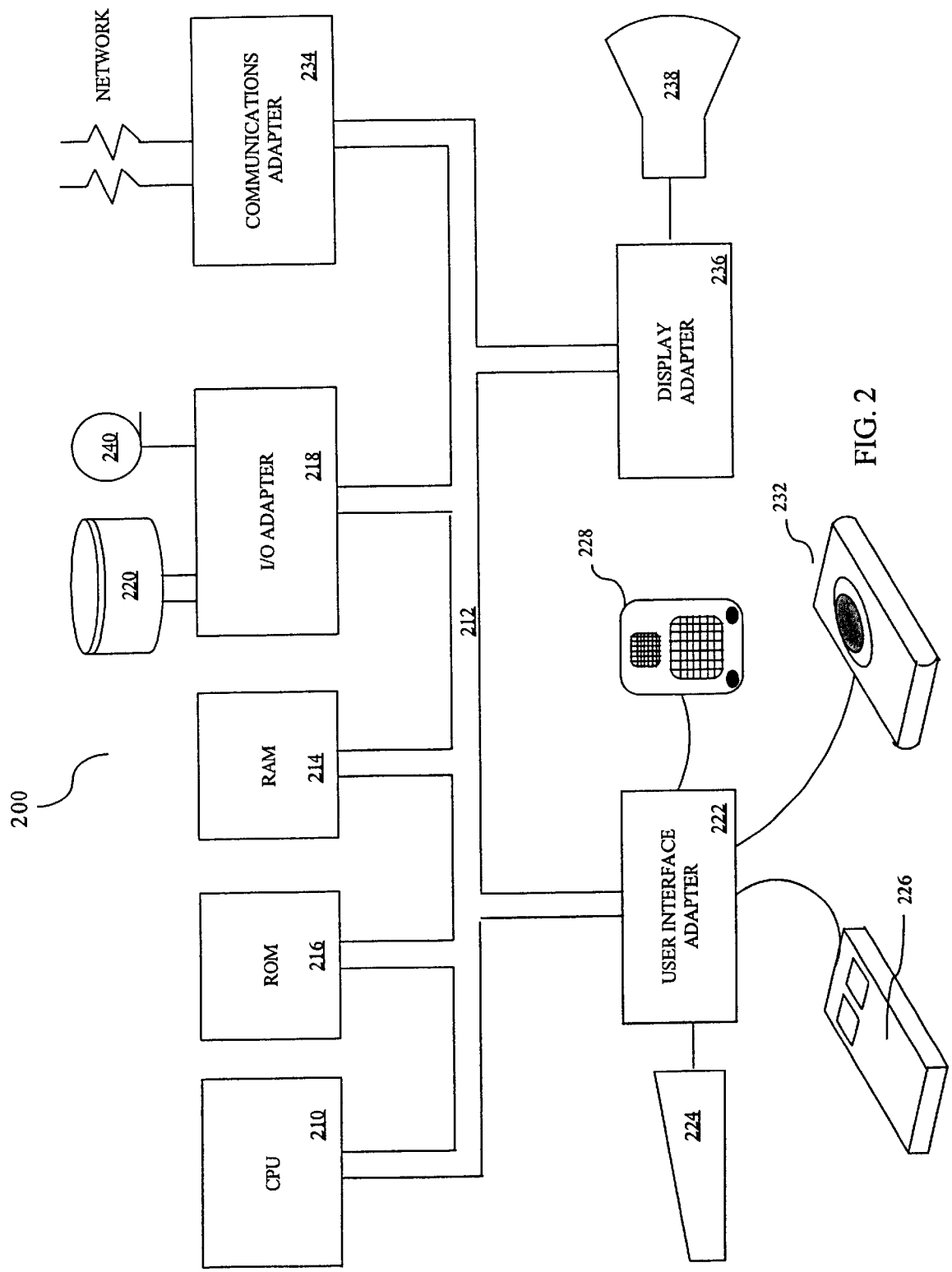
FIG. 2 illustrates a data processing system which may employ embodiments of the present invention.

Referring to FIG. 2, an example is shown of a data processing system 200 which may use embodiments of the present invention. The system has a central processing unit (CPU) 210, which is coupled to various other components by system bus 212. Read-Only Memory ("ROM") 216 is coupled to the system bus 212 and includes a basic input/output system ("BIOS") that controls certain basic functions of the data processing system 200. Random Access Memory ("RAM") 214, I/O adapter 218, and communications adapter 234 are also coupled to the system bus 212. I/O adapter 218 may be a small computer system interface ("SCSI") adapter that communicates with a disk storage device 220 or tape storage device 240. A communications adapter 234 may also interconnect bus 212 with an outside network enabling the data processing system to communicate with other systems. Input/Output devices are also connected to system bus 212 via user interface adapter 222 and display adapter 236. Keyboard 224, trackball 232, mouse 226, and speaker 228 are all interconnected to bus 212 via user interface adapter 222. Display 238 is connected to system bus 212 and display adapter 236. In this manner, a user is capable of inputting to the system through the keyboard 224, trackball 232, or mouse 226, and receiving output from the system via speaker 228, and display 238.

The CPU 210 may run program products that employ the method steps of FIG. 1 of the present invention while executing software code which does register bit scanning. CPU 210 may also execute from ROM 216 program steps which employ the method steps of FIG. 1 while executing software code which does register bit scanning.

Although the present invention and its advantages have been described in detail, it should be understood that various changes, substitutions and alterations can be made herein without departing from the spirit and scope of the invention as defined by the appended claims.

What is claimed is:

1. A method for scanning a sequence of bits in a first register to determine a first occurrence of a logic state, comprising the steps of:

loading contents of said first register into a predicate register, executing, in a program instruction flow, a predetermined sequence of said predicate instructions, said predetermined sequence of predicate instructions corresponding to said sequence of bits to be scanned in said first register; and storing in a second register a returned first register bit location index value in response to said executing of said predetermined sequence of predicate instructions.

2. The method of claim 1, wherein bits of said predicate register are associated as the true or false of a comparison of said predicate register bits to a logic condition of said predicate instructions, said predicate instruction returning a bit location index value of a corresponding bit of said predicate register bit comparison passing said logic condition, said predicate instruction executing a next predicate instruction when a register bit comparison fails said logic condition.

3. The method of claim 2, wherein said first register location index value is a register bit location index value of said predicate register bit passing said logic condition within said sequence of predicate instructions.

4. The method of claim 1, wherein said first register is a bitmask register.

5. The method of claim 1, wherein said sequence of bits in said first register is a numerically discontinuous register bit sequence.

6. A data processing system, comprising:
a central processing unit (CPU);
random access memory (RAM);
read only memory (ROM);
an I/O adapter; and
a bus system coupling said CPU to said ROM, said RAM said display adapter, wherein said CPU further comprises:
  a predicate register; and
  a predicate instruction execution means, wherein said CPU is operable to execute register bit scanning in a first register, said register bit scanning comprising the method steps of:
    loading contents of said first register into a predicate register,
    executing, in a program instruction flow, a predetermined sequence of said predicate instructions, said predetermined sequence of predicate instructions corresponding to said sequence of bits to be scanned in said first register; and
    storing in a second register a returned first register bit location index value in response to said executing of said predetermined sequence of predicate instructions.

7. The data processing system of claim 6, wherein bits of said predicate register are associated as the true or false of a comparison of said predicate register bits to a logic condition of said predicate instructions, said predicate instruction returning a bit location index value of a corresponding bit of said predicate register bit comparison passing said logic condition, said predicate instruction executing a next predicate instruction when a register bit comparison fails said logic condition.

8. The data processing system of claim 7, wherein said first register location index value is a register bit location index value of said predicate register bit passing said logic condition within said sequence of predicate instructions.

9. The data processing system of claim 6, wherein said first register is a bitmask register.

10. The data processing system of claim 6, wherein said sequence of bits in said first register is a discontinuous sequence.

11. A computer program product embodied in a machine readable medium, including programming for a processor system, comprising a program of instructions for performing the program steps of:
  loading contents of said first register into a predicate register,
  executing, in a program instruction flow, a predetermined sequence of said predicate instructions, said predetermined sequence of predicate instructions corresponding to said sequence of bits to be scanned in said first register; and
  storing in a second register a returned first register bit location index value in response to said executing of said predetermined sequence of predicate instructions.

12. The computer program product of claim 11, wherein bits of said predicate register are associated as the true or false of a comparison of said predicate register bits to a logic condition of said predicate instructions, said predicate instruction returning a bit location index value of a corresponding bit of said predicate register bit comparison passing said logic condition, said predicate instruction executing a next predicate instruction when a register bit comparison fails said logic condition.

13. The computer program product of claim 12, wherein said first register location index value is a register bit location index value of said predicate register bit passing said logic condition within said sequence of predicate instructions.

14. The computer program product of claim 11, wherein said first register is a bitmask register.

15. The computer program product of claim 11, wherein said sequence of bits in said first register is a numerically discontinuous register bit sequence.

16. A method for executing first software written for an IBM Power/PC architecture system in an IA64 architecture system comprising the method steps of
  replacing, in said first software, an IBM Power/PC software call to a hardware function execution logic with an IA64 software call to a first software routine, said first software routine comprising emulation of the functionality of said hardware function execution logic; said first software with said IA64 software call ported software from said IBM Power/PC architecture system to said IA64 architecture system; and
  executing said ported software in said IA64 architecture system.

17. The method of claim 16, wherein said hardware execution function logic executes register scanning of a first register.

18. The method of claim 17, wherein said first software routine comprises the steps of:
  loading contents of said first register into a predicate register,
  executing, in a program instruction flow, a predetermined sequence of said predicate instructions, said predetermined sequence of predicate instructions corresponding to said sequence of bits to be scanned in said first register; and
  storing in a second register a returned first register bit location index value in response to said executing of said predetermined sequence of predicate instructions.

19. The method of claim 18, wherein bits of said predicate register are associated as the true or false of a comparison of said predicate register bits to a logic condition of said predicate instructions, said predicate instruction returning a bit location index value of a corresponding bit of said predicate register bit comparison passing said logic condition, said predicate instruction executing a next predicate instruction when a register bit comparison fails said logic condition.

20. The method of claim 19, wherein said first register location index value is a register bit location index value of said predicate register bit passing said logic condition within said sequence of predicate instructions.

21. The method of claim 17, wherein said first register is a bitmask register.

22. The method of claim 17, wherein said sequence of bits in said first register is a numerically discontinuous register bit sequence.

23. The method of claim 18, wherein said first software routine emulates the Power/PC "cntlzw" instruction.

24. The method of claim 18, wherein said first software routine is used to find the first free disk block from a middle of a disk outward, wherein disk block allocation is managed with a hierarchy of bitmask allocation words, wherein a highest level bitmask allocation word indicates groups of disk blocks and a lowest level bitmask word indicates single physical disk blocks, said hierarchy of bitmask allocation words comprises register bits stored in bitmask registers, said bitmask registers selectively correspond to said first register.

* * * * *